United States Patent
Nishizaki

(10) Patent No.: US 7,324,587 B2
(45) Date of Patent: Jan. 29, 2008

(54) COMMUNICATION APPARATUS

(75) Inventor: Shingo Nishizaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1044 days.

(21) Appl. No.: 10/659,176

(22) Filed: Sep. 10, 2003

(65) Prior Publication Data
US 2004/0125749 A1 Jul. 1, 2004

(30) Foreign Application Priority Data
Sep. 19, 2002 (JP) .............................. 2002-273769

(51) Int. Cl.
H04B 1/38 (2006.01)
H04B 3/00 (2006.01)
(52) U.S. Cl. ...................... 375/222; 375/257
(58) Field of Classification Search ........ 375/219–223, 375/257, 258; 379/93.28, 93.36, 102.04, 379/350, 377, 383, 394, 395.01, 413.01, 379/414
See application file for complete search history.

(56) References Cited

U.S. PATENT DOCUMENTS

| 5,822,264 | A | * | 10/1998 | Tomishima et al. | ......... | 365/222 |
| 6,034,909 | A | * | 3/2000 | Brady | ........................ | 365/208 |
| 6,553,118 | B1 | | 4/2003 | Smith et al. | | |
| 6,687,371 | B1 | | 2/2004 | Fischer et al. | | |
| 6,801,621 | B1 | * | 10/2004 | Tennen et al. | .............. | 379/345 |

FOREIGN PATENT DOCUMENTS

| JP | 6-98038 | 4/1994 |
| JP | 7-288577 | 10/1995 |
| JP | 8-233878 | 9/1996 |
| JP | 2001-103126 | 4/2001 |
| JP | 2001-203804 | 7/2001 |

OTHER PUBLICATIONS

Aug. 15, 2006 official action in connection with Japanese Patent Application No. 2002-273769.

* cited by examiner

Primary Examiner—Don N. Vo
(74) Attorney, Agent, or Firm—Cooper & Dunham LLP

(57) ABSTRACT

A communication apparatus comprising a semiconductor DAA, a system unit and a modem is provided. The DAA has a line control unit connected to a communication line network and a serial IF unit connected to the line control unit via an isolating circuit, and controls the communication line network and transmits and receives data. The modem modulates and demodulates the transmitted and received data. The system unit controls the semiconductor DAA and the modem. The line control unit includes a line current detector for detecting a line current and a line voltage detector for detecting a line voltage. The system unit obtains line impedance based on the line current and the line voltage, and adjusts the transmission level of the modem in accordance with the obtained line impedance.

9 Claims, 4 Drawing Sheets

COMMUNICATION APPARATUS

BACKGROUND OF THE INVENTION

1. Field of the Invention

The present invention generally relates to a communication apparatus in which the transmission level of a modem can be adjusted, and more specifically relates to such a communication apparatus that detects a line current and a line voltage to calculate line impedance and adjusts the transmission level of the modem based on the calculated impedance.

2. Description of the Related Art

A two-wire type communication line such as a general public telephone line has line impedance, which varies according to the length from a central telephone office. The variance in the line impedance affects the line current. If the line impedance is high, sufficient current cannot flow and normal communications are obstructed, or attenuation in the communication line to a switchboard may be increased so as to degrade the communications quality.

When the communication lines are connected via a private branch exchange, the amount of line current may vary depending on characteristics of the exchange and the communications quality may vary accordingly.

There have been some proposals for avoiding communications quality degradation. One proposal is to detect a line current and adjust the impedance of a two-wire to four-wire converting circuit to suppress sidetone generation. Another proposal is to detect line impedance and inhibit the communications quality from degrading due to changes in the manner of supplying power to the subscriber lines. These proposals are disclosed in Japanese Laid-open Patent Applications No. 07-288577 and No. 08-233878.

In conventional network control units for controlling communication lines, the major elements are a primary side connected to the line and a secondary side isolatingly connected to the primary side via the conductance of a transformer. This structure generally employs an electric current sensor having a current detecting function provided by a Hall device and the like, to detect a current on the primary side.

Such a sensor detects the primary side line current by using a coil wound on a ferrite core, which senses a magnetic field generated by the line current and outputs a voltage proportional to the line current.

The thus detected voltage is an analog voltage, which cannot be computer-processed itself. Therefore the analog voltage is converted to a digital voltage for further processing. However, an A/D converter becomes necessary in addition to the current sensor and therefore additional mounting space is needed, resulting in high cost.

When detecting a line voltage under the condition that the line is not closed, a detecting circuit and an A/D converter for converting the detected amount of voltage are needed. These circuits should be placed on the primary side, and must be resistant to surges such as lightning surges. It is difficult to provide the actual mounting place for such circuits, resulting in higher cost.

With this background and the recent progress in semiconductor technology and isolation technology, semiconductor devices are being used to replace transformers.

A semiconductor DAA (Data Access Arrangement) can not only replace a conventional transformer but also perform other convenient functions, therefore resulting in higher performance, as shown in Japanese Laid-open Patent Application No. 06-098038.

However, it is difficult to find a mounting place for a line current detector or a line voltage detector, and the cost to manufacture them is high.

In addition, when a loss of the line current or the line voltage is detected, it is difficult to identify the cause of the failure.

SUMMARY OF THE INVENTION

It is a general object of the present invention to provide a communication apparatus that can quickly respond to a communication line failure.

According to one feature of the present invention, a communication apparatus comprises a semiconductor DAA having a line control unit connected to a communication line network, and a serial IF unit connected to the line control unit via an isolating circuit, and controlling the communication line network and transmitting and receiving data; a modem for modulating and demodulating the transmitted and received data; and a system unit for communicating by controlling the semiconductor DAA and the modem. The line control unit includes a line current detector for detecting a line current, and a line voltage detector for detecting a line voltage; and the system unit obtains line impedance based on the line current and the line voltage, and adjusts the transmission level of the modem in accordance with the obtained line impedance.

According to another feature of the present invention, in such a communication apparatus, the system unit determines whether the line current detected by the line current detector is within a predetermined range, and notifies a user of a line failure if not.

According to another feature of the present invention, the system unit determines whether the line voltage detected by the line voltage detector is within a predetermined range, and notifies a user of a line failure if not.

According to yet another feature of the present invention, the line current detector and the line voltage detector start to detect a line current and line voltage, respectively, in response to a detection start signal from the system unit.

DESCRIPTION OF THE PREFERRED EMBODIMENTS

In the following, embodiments of the present invention are described with reference to the accompanying drawings.

Figure 1:
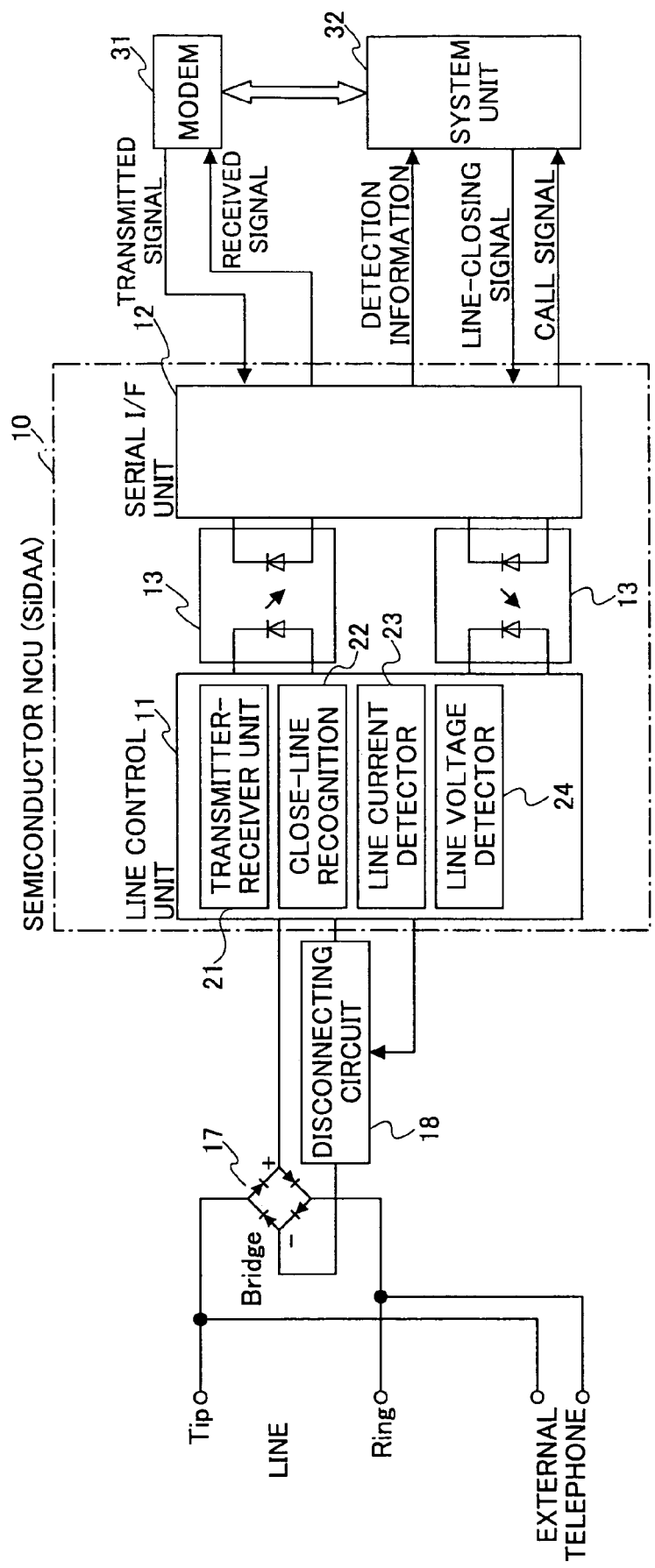
FIG. 1 is a block diagram illustrating a communication apparatus according to a first embodiment of the present invention.

FIG. 1 is a block diagram illustrating a communication apparatus according to an embodiment of the present invention.

The communication apparatus includes a line control unit 11, a serial IF unit 12, an isolating circuit 13, a diode bridge 17, a disconnecting circuit 18, a modem 31 and a system unit 32.

The line control unit 11, the serial IF unit 12, the isolating circuit 13 constitute a semiconductor network control unit (semiconductor NCU) 10. The line control unit 11 and the serial IF unit 12 constitute a semiconductor DAA.

The line control unit 11 comprises a transmitter-receiver unit 21, a close-line recognition unit 22, a line current detector 23 and a line voltage detector 24, and is located on the line side to operate by receiving power from the communication line.

The serial IF unit 12 is located on the system unit side, and interfaces between the line control unit 11 and the system unit side.

The control unit 11 transmits data to and receives data from the serial IF unit 12, and performs line control of and data transmission and reception to and from the communication line, and detects line current and line voltage.

The transmitter-receiver unit 21 in the line control unit 11 receives data from the communication line and transmits the data through the serial IF unit 12 and the modem 31 to the system unit 32. The transmitter-receiver unit 21 transmits data from the system unit 32 through the communication line to another party.

The close line recognition unit 22 determines based on the disconnecting circuit 18 whether the line DC loop is closed or open. The disconnecting circuit 18 operates by receiving power from the communication line, and controls the connection between the communication line and the line control unit 11.

The line current detector 23 detects an electric current flowing through the communication line, and the line voltage detector 24 detects a voltage across two line elements of the communication line.

In response to a detection execution signal from the system unit 32, the line current detector 23 and the line voltage detector 24 detect the line current and the line voltage, respectively. The detected line current and line voltage are converted to signals similar to the control signal for line network controlling, and transmitted through the serial IF unit 12 to the system unit 32.

The isolating circuit 13 connects to the line control unit 11 and the serial IF unit 12 in an isolating manner, and interfaces between them to transmit and receive data between them. The isolating circuit 13 comprises a linear coupler, a transformer, a capacitor and others.

The modem 31 modulates and demodulates data to be transmitted and received, respectively. The system unit 32 controls the whole communication apparatus, and calculates line impedance based on the line current and the line voltage detected by the line current detector 23 and the line voltage detector 24. The system unit 32 adjusts the transmission level of the modem 31 in accordance with the calculated line impedance.

Figure 2:
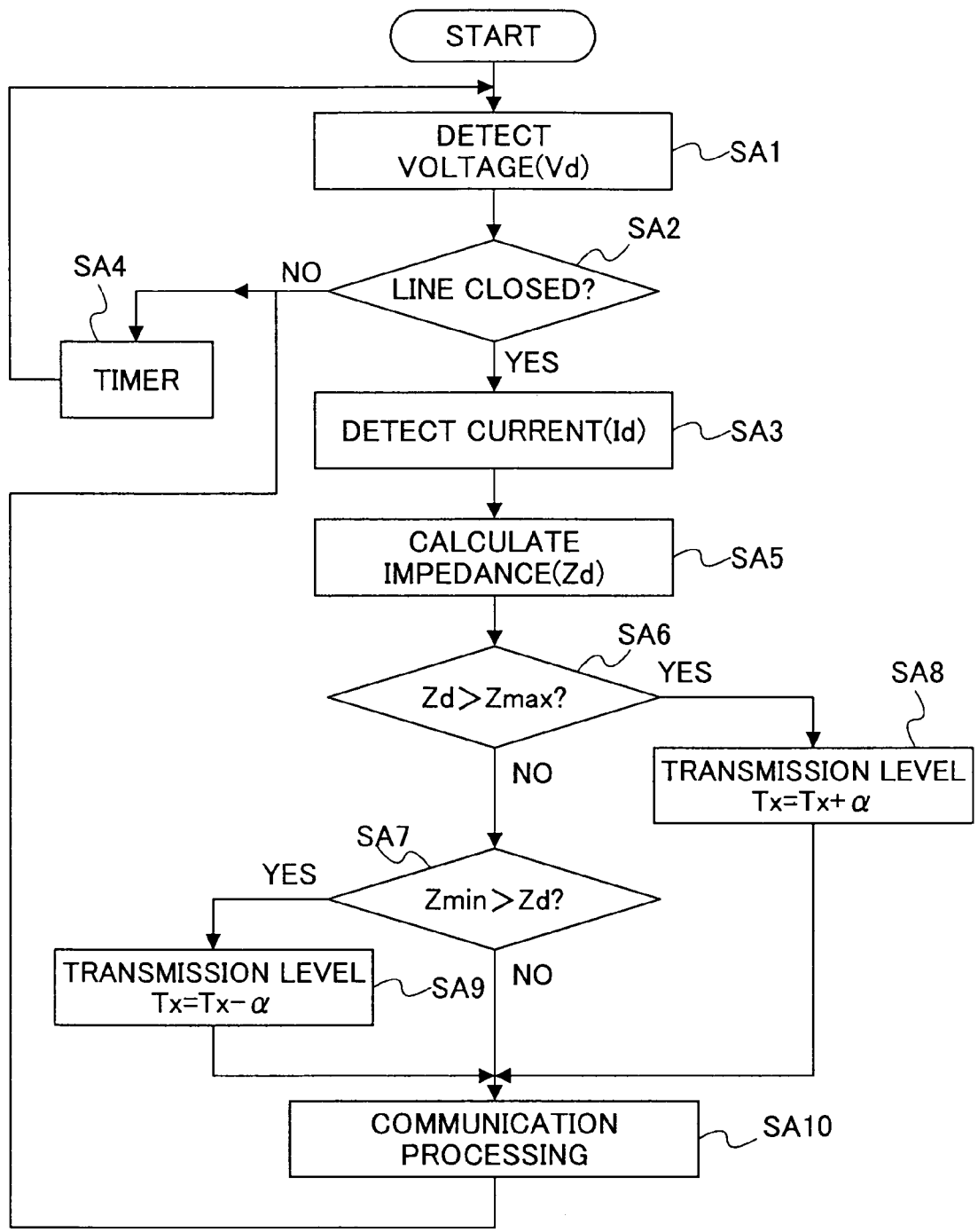
FIG. 2 is a flow chart illustrating an adjusting procedure for the transmission level of a modem according to the first embodiment of the present invention.

In this structure, a procedure for adjusting the transmission level of the modem 31 is explained below with reference to FIG. 2.

First, a line voltage (Vd) detection is conducted at step SA1, then whether the communication line is closed is determined at step SA2. Therefore the line voltage detection is always performed irrespective of whether the communication line is closed.

If the communication line is not closed, after waiting for a predetermined time duration (step SA4), then the line voltage detection is performed again at step SA1.

On the other hand, if the communication line is closed for data transmission and reception and the like, a line current (Id) is detected at step SA3.

Based on the thus detected line current and line voltage, line impedance (Zd) is calculated at step SA5. Whether the calculated line impedance (Zd) is within a predetermined range is determined at step SA6.

If the calculated line impedance Zd exceeds the predetermined range, then the present transmission level Tx of the modem 31 is increased by a predetermined constant $\alpha$ (Tx=Tx+$\alpha$) at step SA8 to perform further communications (SA10).

In this manner, the communication processing is completed, the procedure goes back to step SA4, and after waiting for the predetermined time duration the procedure starts again at step SA1.

Although the above explanation is given regarding the case where both the line current and the line voltage are detected, the present invention is not limited to this case. The present invention can be applied to other situations, such as where a communication apparatus is connected to a different communication line when it is established or transferred. In this situation, the modem transmission level can be adjusted by user's instruction.

Generally, the line condition does not vary so frequently, and therefore it may be practical to adjust the transmission level of the modem 31 at a certain frequency such as once a week.

Further, the waiting time duration at step SA4 can be adjusted in accordance with characteristics of the communication apparatus and the communication line.

As explained above, the line control unit 11 is provided with the line current detector 23 and the line voltage detector 24, and therefore the communication apparatus can automatically adjust the transmission level of the modem to the optimum level. The communication quality can be improved. The line current detector 23 and the line voltage detector 24 can be manufactured together with other components in the semiconductor DAA through a series of semiconductor fabricating processes, and therefore the communication apparatus can be miniaturized and its cost can be reduced.

Next, a second embodiment of the present invention is explained with reference to the drawings. Parts or members in the second embodiment that are the same as in the first embodiment are assigned the same reference numbers and are not explained.

In the first embodiment, the line current and the line voltage are detected to calculate the line impedance, and the transmission level of the modem 31 is adjusted based on the calculated line impedance. When the communication line has an error or failure, the transmission level of the modem 31 cannot necessarily be adjusted.

In the second embodiment, when it is determined based on the amount of the detected line current that the communication line has an error, the user is notified of the error.

Figure 3:
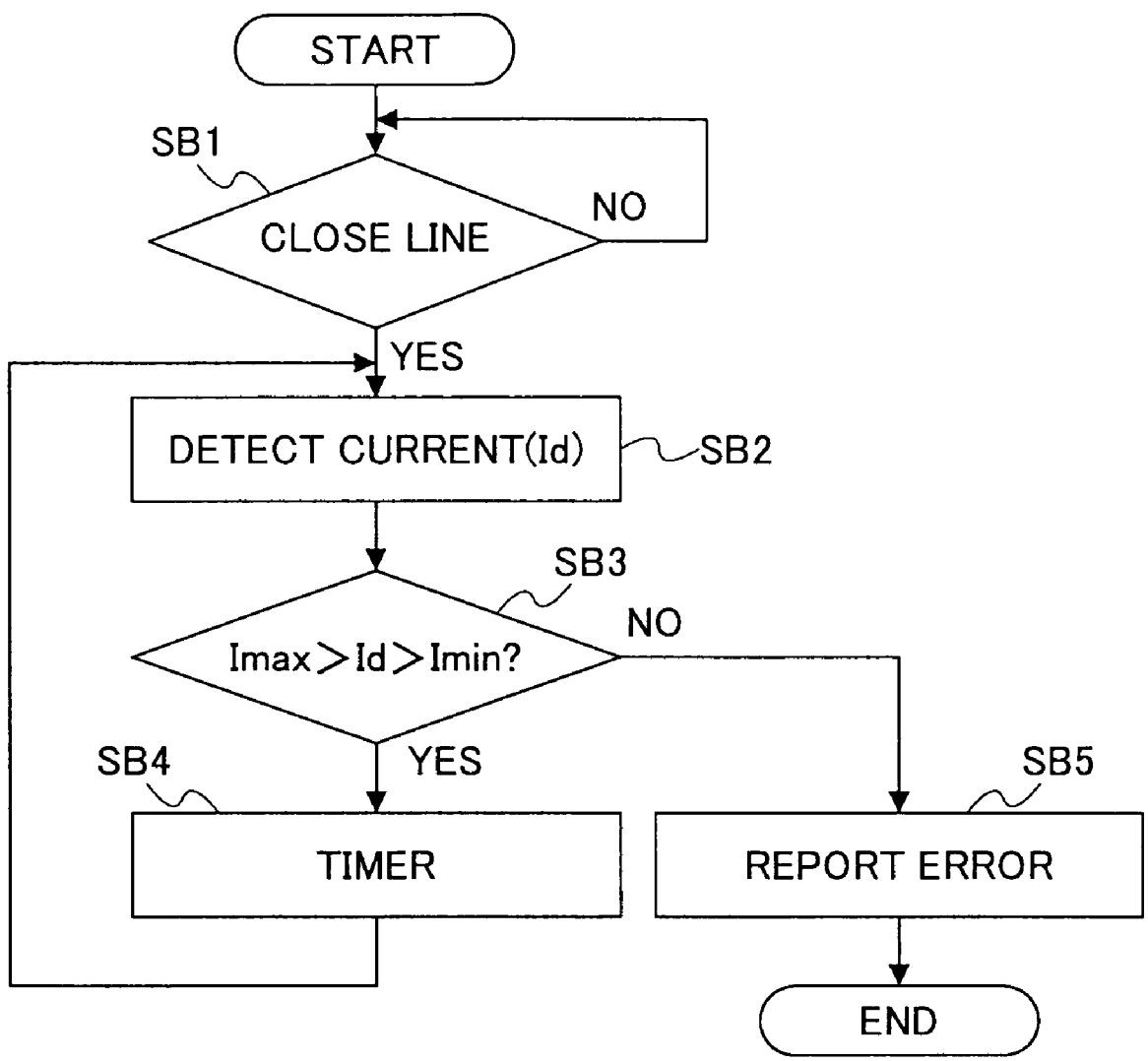
FIG. 3 is a flow chart illustrating a procedure for finding a failure in a communication line by detecting a line current according to a second embodiment of the present invention.

A procedure for reporting according to the second embodiment is explained below with reference to a flow chart shown in FIG. 3.

First, it is determined whether the communication line is closed at step SB1.

When the communication line is closed, a line current (Id) is detected at step SB2. Then it is determined at step SB3 whether the detected line current Id falls within a predetermined range.

In this embodiment, an upper limitation Imax and a lower limitation Imin for the predetermined range are previously stored.

If the detected line current is within the predetermined range, after waiting for a predetermined time duration (step SB4), the line current detecting step SB2 and the determination step SB3 are performed again.

On the other hand, if the detected line current is outside the range, there might be an error or a failure in the communication line or a switchboard or in the connection between the communication line and the communication apparatus, and therefore the user is notified (SB5) that something is wrong with the line current.

Figure 4:
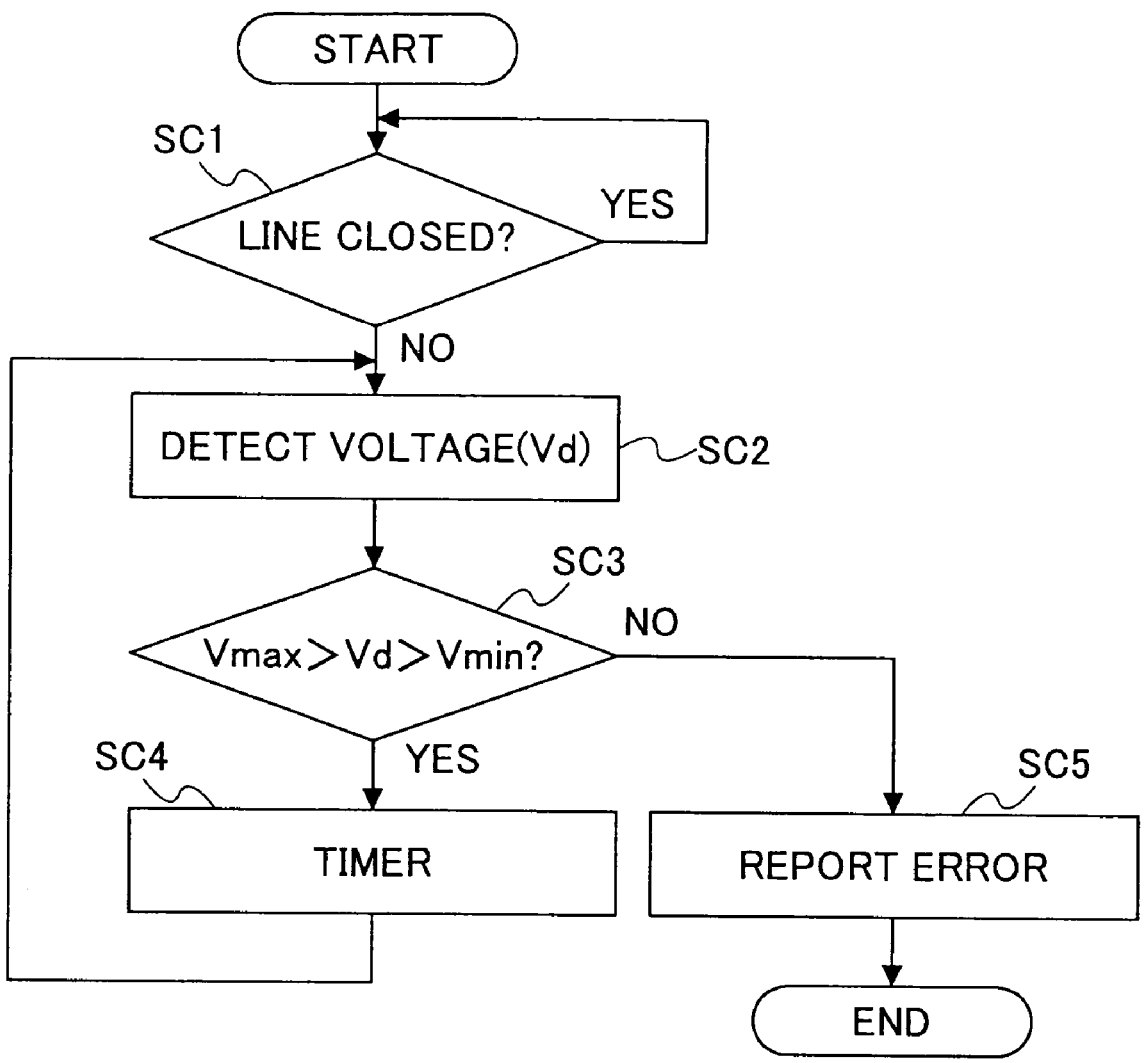
FIG. 4 is a flow chart illustrating a procedure for finding a failure in a communication line by detecting a line voltage according to a third embodiment of the present invention.

In the above explained embodiment, the line current is detected. However, line voltage detection can be utilized in order to determine whether a line failure has occurred. A procedure in this case is explained with reference to a flowchart shown in FIG. 4.

First, it is determined whether the communication line is closed at step SC1.

When the communication line is closed, a line voltage (Vd) is detected at step SC2. Then it is determined at step SC3 whether the detected line voltage Vd falls within a predetermined range.

In this embodiment, an upper limitation Vmax and a lower limitation Vmin for the predetermined range are previously stored.

If the detected line voltage is within the predetermined range, after waiting for a predetermined time duration (step SC4), the line voltage detecting step SC2 and the determination step SC3 are performed again.

On the other hand, if the detected line voltage is outside the range, there might be an error or a failure in the communication line or a switchboard or in the connection between the communication line and the communication apparatus, and therefore a user is notified (SB5) that something is wrong with the line voltage.

Means to notify a user of an error include alarm, voice, blinking light and any other measure indicating the condition of the communication apparatus or line. Alternatively, a combination of these measures can be used.

If the communication apparatus has an operating board or table, the alarm can be indicated on the board or table. If the communication apparatus includes a printer, errors and their possible causes can be printed out. In this manner, a user can quickly respond to an error and the reliability of the communications is improved.

According to one feature of the present invention, a communication apparatus is provided with a line control unit on a primary side of a semiconductor DAA and the line control unit includes a line current detector and a line voltage detector. Therefore, the communication apparatus can automatically adjust the transmission level of a modem to the optimum level, and the communications quality can be improved. The line current detector and the line voltage detector can be manufactured together with other components in the semiconductor DAA through a series of semiconductor fabricating processes, and therefore the communication apparatus can be miniaturized and its cost can be reduced.

According to another feature of the present invention, a system unit of the communication apparatus determines whether the line current detected by the line current detector is within a predetermined range, and notifies a user of a line failure if not. Therefore, the apparatus becomes more convenient and reliable.

According to another feature of the present invention, the system unit determines whether the line voltage detected by the line voltage detector is within a predetermined range, and notifies a user of a line failure if not. Therefore, the apparatus becomes more convenient and reliable.

According to another feature of the present invention, the line current detector and the line voltage detector start to detect a line current and line voltage, respectively, in response to a detection start signal sent from the system unit. Therefore the transmission level of the modem can be adjusted to the optimum level with simple control and the communications quality is improved.

Further, the present invention is not limited to these embodiments, but various variations and modifications may be made without departing from the scope of the present invention.

The present application is based on Japanese Priority Application No. 2002-273769 filed on Sep. 19, 2002 with the Japanese Patent Office, the entire contents of which are hereby incorporated by reference.

What is claimed is:

1. A communication apparatus comprising:
   a semiconductor DAA having a line control unit connected to a communication line network and a serial IF unit connected to the line control unit via an isolating circuit, the semiconductor DAA controlling the communication line network and transmitting and receiving data;
   a modem for modulating and demodulating the transmitted and received data; and
   a system unit for controlling the semiconductor DAA and the modem, wherein:
   the line control unit includes a line current detector for detecting a line current, and a line voltage detector for detecting a line voltage; and
   the system unit obtains line impedance based on the line current and the line voltage, and adjusts a transmission level of the modem in accordance with the obtained line impedance.

2. The communication apparatus as claimed in claim 1 wherein,
   the system unit determines whether the line current detected by the line current detector is within a predetermined range, and notifies a user of a line failure if the line current is not within the predetermined range.

3. The communication apparatus as claimed in claim 1 wherein,
   the system unit determines whether the line voltage detected by the line voltage detector is within a predetermined range, and notifies a user of a line failure if the line voltage is not within the predetermined range.

4. The communication apparatus as claimed in claim 1 wherein,
   the line current detector and the line voltage detector start to detect the line current and the line voltage, respectively, in response to a detection start signal from the system unit.

5. A communication apparatus comprising:
   a semiconductor DAA having line controlling means connected to a communication line network and serial IF means connected to the line controlling means via an isolating circuit, the semiconductor DAA controlling the communication line network and transmitting and receiving data;
   modem means for modulating and demodulating the transmitted and received data; and a system unit for controlling the semiconductor DAA and the modem means, wherein:

the line controlling means include line current detecting means for detecting a line current, and line voltage detecting means for detecting a line voltage; and the system unit obtains line impedance based on the line current and the line voltage, and adjusts a transmission level of the modem means in accordance with the obtained line impedance.

6. The communication apparatus as claimed in claim 5 wherein, the system unit determines whether the line current detected by the line current detecting means is within a predetermined range, and notifies a user of a line failure if the line current is not within the predetermined range.

7. The communication apparatus as claimed in claim 5 wherein, the system unit determines whether the line voltage detected by the line voltage detecting means is within a predetermined range, and notifies a user of a line failure if the line voltage is not within the predetermined range.

8. The communication apparatus as claimed in claim 5 wherein, the line current detecting means and the line voltage detecting means start to detect the line current and the line voltage, respectively, in response to a detection start signal from the system unit.

9. A method for adjusting a transmission level of a modem in a communication apparatus comprising: a semiconductor DAA having a line control unit connected to a communication line network and a serial IF unit connected to the line control unit via an isolating circuit, the semiconductor DAA controlling the communication line network and transmitting and receiving data; the modem for modulating and demodulating the transmitted and received data; and a system unit for controlling the semiconductor DAA and the modem, the method comprising the steps of:

detecting a line current with a line current detector in the line control unit;

detecting a line voltage with a line voltage detector in the line control unit;

obtaining line impedance based on the line current and the line voltage with the system unit; and adjusting the transmission level of the modem in accordance with the obtained line impedance.

* * * * *